United States Patent [19]

Polzer et al.

[11] 4,391,096

[45] Jul. 5, 1983

[54] HYDRODYNAMIC REVERSING TRANSMISSION

[75] Inventors: Erich Polzer; Gottfried Ruetz, both of Heidenheim; Hubert Schmölz, Nattheim; Rémy Pochon, Heidenheim, all of Fed. Rep. of Germany

[73] Assignee: Voith Getriebe KG, Heidenheim, Fed. Rep. of Germany

[21] Appl. No.: 216,554

[22] Filed: Dec. 15, 1980

[30] Foreign Application Priority Data

Mar. 20, 1980 [DE] Fed. Rep. of Germany ....... 3010661

[51] Int. Cl.³ ............................................ F16D 33/00
[52] U.S. Cl. ......................................... 60/335; 60/357; 60/363; 74/718; 74/731; 74/732
[58] Field of Search ....................... 60/335, 357, 363; 74/677, 688, 718, 720, 731, 732

[56] References Cited

U.S. PATENT DOCUMENTS

| | | | |
|---|---|---|---|
| 3,566,715 | 3/1971 | Keller et al. | 60/363 |
| 4,077,502 | 3/1978 | Nitsche et al. | 192/4 B |
| 4,099,426 | 7/1978 | Keller et al. | 60/363 |
| 4,184,330 | 1/1980 | Polzer et al. | 60/363 |
| 4,237,748 | 12/1980 | Brimmer et al. | 74/732 |

FOREIGN PATENT DOCUMENTS

| | | |
|---|---|---|
| 1140789 | 12/1962 | Fed. Rep. of Germany . |
| 2706950 | 4/1979 | Fed. Rep. of Germany . |
| 2911424 | 9/1980 | Fed. Rep. of Germany . |

Primary Examiner—A. Michael Chambers
Attorney, Agent, or Firm—Kontler, Grimes & Battersby

[57] ABSTRACT

A hydrodynamic reversing transmission wherein each of the forward and reverse drive trains between the input and output shafts has a starting torque converter with a stationary housing, a rotary turbine wheel and a set of adjustable guide vanes. The draining lines of the torque converters have inlet portions which are connected with the respective housings and are oriented in such a way that the direction of fluid flow therein is identical with or closely approximates the direction of fluid flow between the adjacent blades of the turbine wheel when the respective torque converters are operated within the counterbraking range. Each inlet portion has an aperture which is in permanent communication with the sump. The ratio of the outer diameter to the inner diameter of each turbine wheel is between 1.1 and 1.25, and the ratio of distances between the tips of neighboring blades of the turbine wheel to the outer diameter of the turbine wheel is between 0.06 and 0.09. One of the torque converters serves as a brake irrespective of the direction of movement of the vehicle as soon as the RPM of the output shaft rises to a preselected value.

12 Claims, 7 Drawing Figures

HYDRODYNAMIC REVERSING TRANSMISSION

BACKGROUND OF THE INVENTION

The present invention relates to hydrodynamic reversing transmissions, and more particularly to improvements in hydrodynamic reversing transmissions which can be utilized with advantage in earth moving vehicles, forklift trucks, locomotives for shunting or switching service in marshalling yards, or other types of heavy-duty conveyances. Still more particularly, the invention relates to improvements in hydrodynamic reversing transmissions of the type wherein each of the forward and reverse drive trains comprises at least one hydrodynamic torque converter.

Commonly owned U.S. Pat. No. 4,184,330 granted Jan. 22, 1980 to Polzer et al. discloses a hydrodynamic reversing transmission wherein the input shaft receives torque from an internal combustion engine and the output shaft transmits torque to the wheels of an earth moving vehicle or the like. The vehicles which can utilize hydrodynamic reversing transmissions, e.g., transmissions of the type disclosed in the patent to Polzer et al., will often move back and forth, for example, in a first direction to fill the bucket of a scraper and thereupon in the opposite direction to move the filled bucket to an unloading station. An advantage of a hydrodynamic reversing transmission in a vehicle of the just outlined character is that the wear upon the parts of the transmission is practically nil when the operator decides to change the direction of movement from forward to reverse or vice versa. Thus, all that is necessary is to drain the torque converter or converters which was or were operatively connected with the output shaft of the transmission and to simultaneously fill the torque converter or converters which are about to transmit torque to the output shaft. The switchover (i.e., draining of the active torque converter or converters and simultaneous filling of the previously inactive torque converter or converters) can take place while the vehicle is in motion whereby the transmission performs a desirable braking action, i.e., the torque converter or converters which are in the process of being filled oppose further movement in the direction in which the vehicle is moving during such switchover. This can (and hereinafter will) be called the counterbraking range or the range within which the turbine of a converter operates in the negative direction.

In order to achieve a high starting torque, each of the at least two torque converters of the hydrodynamic reversing transmission which embodies the present invention preferably constitutes a starting converter, i.e., the optimum efficiency of such converters is accomplished when the ratio $(n_T/n_P)$ of RPM of the turbine wheel to RPM of the pump wheel is between 0.35 and 0.6. Rapid reaction of the hydrodynamic reversing transmission to signals which are initiated by the operator of the vehicle is ensured if the transmission includes or is combined with a reversing valve of the type disclosed in the aforementioned patent to Polzer et al. Moreover, the reversing transmission receives working fluid from a large-volume hydrostatic filling pump which is designed to deliver working fluid at a substantially constant rate under all operating conditions and is installed in a so-called open hydraulic circuit.

It has been found that the aforementioned reversing transmission of Polzer et al. can present problems during certain stages of operation, for example, when a torque converter is utilized for hydrodynamic braking within the counterbraking range. It is particularly difficult to achieve a satisfactory progress of braking moment within the entire range of rotational speeds of the turbine wheel, i.e., a progress which is satisfactory when the transmission is in actual use. It is already known to select various braking moments by adjusting the positions of adjustable guide vanes (or by otherwise influencing the torus- or doughnut-shaped flow of working fluid) within the range of relatively low negative turbine wheel speeds. The characteristic curves of braking moments at different positions of the guide vanes preferably form a pattern of fanwise arranged curves. However, when the negative turbine wheel speed (and more particularly the ratio $n_T/n_P$ of RPM of the turbine wheel to RPM of the pump wheel) is relatively high, the characteristic curves which denote the braking torque and correspond to different positions of adjustable guide vanes extend in part downwardly and in part upwardly as the aforementioned ratio $n_T/n_P$ increases, i.e., the characteristic curves intersect each other. This renders it practically impossible to select different braking moments for various speeds of the vehicle which embodies the patented reversing transmission. Furthermore, when the aforementioned ratio is relatively high, the braking moment which is furnished in response to movement of adjustable guide vanes to certain positions is much too high. This renders it necessary to undertake additional steps in order to limit the braking moment.

OBJECTS AND SUMMARY OF THE INVENTION

An object of the invention is to provide a novel and improved hydrodynamic reversing transmission which is constructed and assembled in such a way that the characteristic curves of braking moments do not intersect each other in response to movement of the guide vanes to different positions while the torque converters operate in the counterbraking range.

Another object of the invention is to provide the reversing transmission with novel, improved, simple and inexpensive means for limiting the braking moment to a maximum permissible value in the range of high negative ratios of RPM of the turbine wheel to RPM of the pump wheel.

A further object of the invention is to provide a hydrodynamic reversing transmission with novel and improved means for automatically limiting the speed of forward or reverse rotation of the output element of the transmission.

An additional object of the invention is to provide novel and improved means for automatically limiting the maximum braking moment with minimal expenditures for additional equipment.

Another object of the invention is to provide a reversing transmission of the above outlined character which can be used with advantages in a variety of vehicles, particularly in heavy-duty earth moving vehicles, locomotives and the like.

An additional object of the invention is to provide the reversing transmission with novel and improved means for automatically adjusting the positions of guide vanes in the torque converters.

An ancillary object of the invention is to provide a relatively simple and compact hydrodynamic reversing transmission and to provide such transmission with novel and improved torque converters.

One feature of the invention resides in the provision of a hydrodynamic reversing transmission, particularly for use in earth moving vehicles or the like. The transmission comprises rotary input means (e.g., a shaft which is driven by an internal combustion engine at a constant speed), reversible output means (e.g., a second shaft which can transmit motion to the wheels of the vehicle), and forward and reverse drive trains which connect the input means with the output means and respectively include first and second hydrodynamic starting torque converters. The first and second converters respectively comprise first and second working circuits which are respectively rendered operative and inoperative or ineffective, also within the counterbraking range, in response to admission and evacuation of working fluid. Each working circuit includes a stationary housing, a turbine wheel which is designed for substantially centrifugal flow of working fluid therethrough, and means (e.g., sets of adjustable guide vanes which can be moved between open and closed positions as well as to a plurality of intermediate positions) for influencing the torus stream in the respective circuit. The transmission further comprises a source of pressurized working fluid (preferably a constant-delivery pump which draws working fluid from the sump), first and second filling lines connecting the source with the respective circuits, first and second draining lines having inlet portions connected with the respective housings, and reversing means (e.g., a suitable valve) for regulating the flow of fluid in the lines so that the first filling line delivers fluid from the source to the first circuit and the first draining line is sealed from the sump when the second filling line is sealed from the source and the second draining line communicates with the sump, and vice versa. The inlet portions of the draining lines have permanently open apertures for evacuation of some working fluid from the respective housings and the inlet portions are disposed in the regions of outflow of fluid from the respective turbine wheels. The orientation of the inlet portions of the draining lines is such that the direction of fluid flow therein coincides, at least substantially, with the direction of fluid flow toward the inlet portions within the aforementioned counterbraking range.

The apertures in the inlet portions of the draining lines are arranged to admit working fluid into the sump. The ratio of the outer and inner diameters of the turbine wheels in both torque converters is preferably between 1.1 and 1.25. The tips of neighboring blades of the turbine wheels are equidistant from each other and the ratio of the distance between the tips of two neighboring blades and the outer diameter of a turbine wheel is preferably between 0.06 and 0.09, i.e., it is preferred to provide each turbine wheel with a relatively large number of blades.

In accordance with a presently preferred embodiment of the invention, the apertures in the inlet portions of the draining lines constitute the only outlets for unobstructed and uninterrupted outflow of working fluid from the respective torque converters during each and every phase or stage of operation of the converters. Thus, whereas the draining lines can be sealed by the aforementioned reversing valve or the like, the apertures remain exposed and communicate with the sump at all times.

In accordance with a modification, the directions of fluid flow into the inlet portions of the draining lines make acute angles with the planes which are normal to the axes of the respective turbine wheels; such acute angles are preferably between 5 and 30 degrees.

One of the torque converters (preferably the torque converter in the reverse drive train, especially if the vehicle which employs the transmission is driven primarily or predominantly in the forward direction) is designed to brake the output means irrespective of the direction of movement of the vehicle in which the transmission is used whenever the RPM of the output means increases to a predetermined value. The transmission then further comprises a tachometer generator or other suitable means for monitoring the RPM of the output means and a bypass valve or analogous means for actuating the reversing means so as to connect the source with the filling line for the one torque converter and to seal the respective draining line from the sump when the monitored RPM of the output means reaches the predetermined value.

Each working circuit further comprises a pump wheel which is rotatable with respect to the corresponding turbine wheel, and the transmission preferably further comprises means for opening and closing the guide vanes of the working circuits, means for monitoring the ratio $n_T/n_P$ of the RPM of the turbine wheel to the RPM of the pump wheel of the effective torque converter, and means for effecting closing of the guide vanes of such torque converter when the ratio $n_T/n_P$ reaches a predetermined value (n) at which the output torque equals or closely approximates zero.

Another feature of the invention resides in the provision of a torque converter which embodies at least some of the above outlined features and can be used in a hydrodynamic-mechanical transmission as the only or sole hydrodynamic component of such transmission.

The novel features which are considered as characteristic of the invention are set forth in particular in the appended claims. The improved hydrodynamic reversing transmission itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
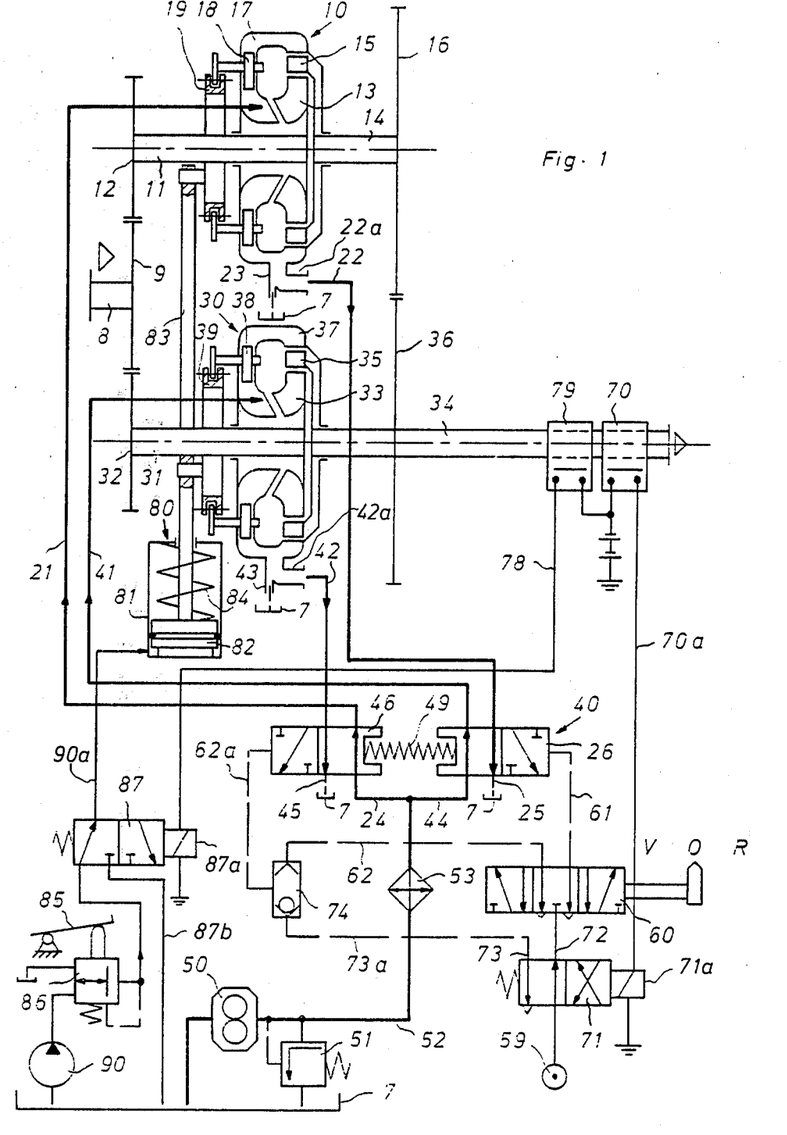
FIG. 1 is a schematic view of a hydrodynamic reversing transmission with two torque converters which embodies the present invention.

Referring first to FIG. 1, there is shown a hydrodynamic reversing transmission which comprises two substantially identical hydrodynamic torque converters 10 and 30. The working circuits of the torque converters 10 and 30 respectively comprise primary shafts 11 and 31 with spur gears 12 and 13 and pump wheels 13 and 33, and secondary shafts 14 and 34 with turbine wheels 15 and 35 and spur gears 16 and 36. The stationary housings of the torque converters 10 and 30 are respectively shown at 17 and 37. The working circuits of the torque converters 10 and 30 further respectively comprise adjustable guide vanes 18 and 38 as well as adjusting rings 19 and 39 for the associated guide vanes 18 and 38. The guide vanes 18 and 38 influence the torus streams in the respective working circuits.

The spur gears 12 and 32 on the respective primary shafts 11 and 32 mate with a driver gear 9 which is rotated by an input shaft 8 receiving torque from an internal combustion engine or another suitable prime mover, not shown. It will be noted that the primary shafts 11, 31 and the associated pump wheels 13, 33 always rotate in the same direction. The spur gears 16 and 36 mesh with each other so that the secondary shafts 14 and 34 of the torque converters 10 and 30 as well as the turbine wheels 15 and 35 rotate in opposite directions. One of the secondary shafts 14 and 34 (in the embodiment of FIG. 1 the secondary shaft 34) constitutes the reversible output shaft of the transmission.

The torque converters 10 and 30 are operatively connected with a reversing valve 40 which may be of the type described and shown (e.g., in FIG. 4) of the aforementioned U.S. Pat. No. 4,184,330. The disclosure of this patent is incorporated herein by reference. Filling connections or lines 21 and 41 respectively connect the fluid discharging ports of the housing or body of the reversing valve 40 with the torque converters 10 and 30. The reference characters 22 and 42 denote two draining lines which respectively connect the torque converters 10 and 30 with the reversing valve 40. The draining lines 22 and 42 are respectively provided with permanently open draining apertures 23 and 43 which discharge working fluid into the sump 7. The housing of the reversing valve 40 has two filling ports 24 and 44 and two fluid discharging ports 25 and 45. The ports 25 and 45 can be used to constitute the outlet portions of the draining lines 22, 42 and serve to discharge working fluid into the sump 7.

The means for supplying pressurized working fluid to the filling ports 24 and 44 of the reversing valve 40 comprises a large positive displacement pump 50 (e.g., a gear pump) which draws fluid from the sump 7 and delivers pressurized fluid to a pressure line 52 which is connectable with the sump 7 by way of a safety valve 51. Working fluid which flows from the pump 50 toward the filling ports 24 and 44 in the housing or body of the reversing valve 40 via pressure line 52 is cooled in a heat exchanger 53. It will be noted that the hydraulic circuits of the torque converters 10 and 30 are open, i.e., all of the fluid which is admitted to the torque converter 10 or 30 is drawn from the sump 7 by the pump 50 and all of the fluid which leaves the torque converter 10 or 30 is returned to the sump 7 prior to reentering a converter.

The reversing valve 40 comprises the aforementioned housing or body with the ports 24, 44 and 25, 45 as well as two reciprocable valving elements 26 and 46 each of which can be moved between two end positions. A biasing means 49 (e.g., a helical compression spring which is disposed between the valving elements 26 and 46) tends to maintain the valving elements 26 and 46 in the illustrated end positions in which the valving element 26 allows pressurized working fluid to flow from the filling port 24 into the filling line 21 while the valving element 26 allows pressurized working fluid to flow from the filling port 44 (i.e., from the pressure line 52) into the filling line 41. At the same time, the draining lines 22 and 42 are connected with the sump 7 via ports 25, 45. Thus, working fluid flows through each of the two torque converters 10 and 30 so that the converters are partially filled with working fluid and act against each other with low energy requirements. The reversible output shaft 34 of the reversing transmission is at a standstill. If one of the valving elements 26, 46 is shifted from the illustrated end position (i.e., against the opposition of the biasing means 49) toward the other end position, the thus shifted valving element interrupts the connection between the draining line 22 or 42 and the sump 7. It is assumed that the valving element 26 has been shifted against the opposition of the biasing means 49 so that the draining line 22 for the torque converter 10 is sealed from the sump 7. At the same time, the thus shifted valving element 26 interrupts the connection between the pressure line 52 (port 44) and the filling line 41 for the torque converter 30; this results in establishment of communication between the filling line 41 and the sump 7 via port 25. The remaining connections (between the draining line 42 and the sump 7 as well as between the filling line 21 and the port 24 and pressure line 52) remain unchanged. Consequently, pressure of the working fluid in the interior of the torque converter 10 rises rapidly, i.e., the torque converter 10 can transmit torque to the output shaft 34 of the reversing transmission. At the same time, the working fluid which has partially filled the torque converter 30 is allowed to flow into the sump 7, and such evacuation of working fluid from the torque converter 30 is completed within a short interval of time. Analogously, the torque converter 30 will be caused to transmit torque to the output shaft 34 and the contents of the torque converter 10 will be rapidly evacuated into the sump 7 in response to shifting of the valving element 46 against the opposition of the biasing means (valve spring) 49. When the valving element 46 reaches its other end position, the filling line 21 is connected to the sump 7, the draining line 22 continues to communicate with the sump, the filling line 41 continues to communicate with the pressure line 52, and the draining line 42 is sealed from the sump. The difference is that the activated torque converter 30 drives the output shaft 34 in the opposite direction.

The displacing means for shifting the valving elements 26, 46 of the reversing valve 40 between the two end positions (i.e., against the opposition of the biasing means 49) comprises a servo valve 60 whose valving element can be moved between a neutral position "O", a first operative position "V" and a second operative position "R". Reference may be had to FIG. 3 of the aforementioned U.S. Pat. No. 4,184,330. When the valving element of the servo valve 60 assumes the operative position "V", it connects a source 59 of pressurized fluid with a control line 61 (by way of a solenoid-operated valve 71 and conduit 72) whereby the pressurized fluid acts against the right-hand end face of the valving element 26 (as viewed in FIG. 1) and shifts the valving element 26 against the opposition of the biasing means 49. When the valving element of the servo valve 60 is moved to the other operative position "R", the source 59 is connected with a pressure line 62a which admits pressurized fluid against the left-hand end face of the valving element 46 (as viewed in FIG. 1) so that the valving element 46 is shifted to its other end position against the resistance of the biasing means 49. The control line 62a then communicates with the source 59 by way of a further control line 62, conduit 72 and solenoid-operated valve 71. The pressure of fluid in the control line 61 drops (i.e., the valving element 26 can return to the end position of FIG. 1) when the pressure in the control line 62a rises, and vice versa. When the valving element of the servo valve 60 assumes the illustrated neutral position "O", the pressure of fluid in the control line 61 and/or 62a does not suffice to enable the respective valving element 26 or 46 to overcome the opposition of the biasing means 49, i.e., the valving elements 26 and 46 then dwell in the end positions shown in FIG. 1.

Figures 2, 3, 4, 5:
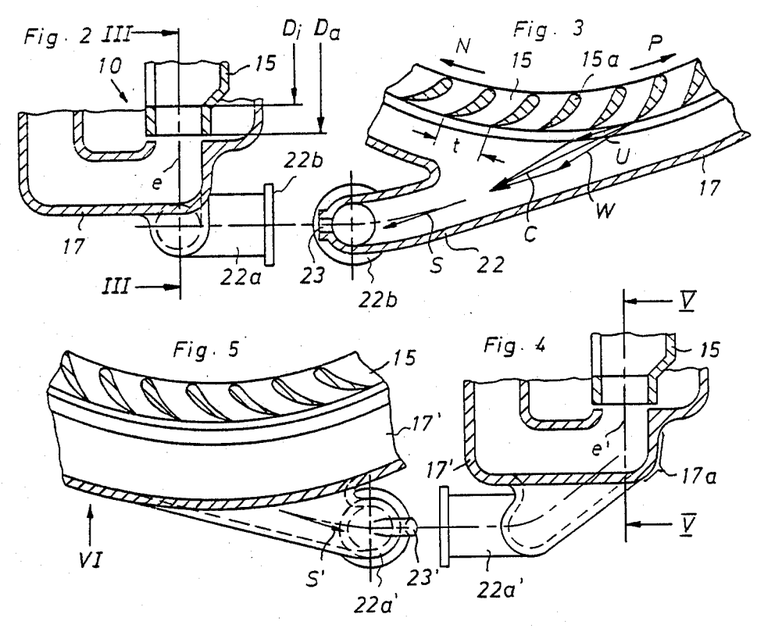
FIG. 2 is an enlarged fragmentary section view of one of the torque converters in the transmission of FIG. 1.
FIG. 3 is a sectional view as seen in the direction of arrows from the line III—III of FIG. 2.
FIG. 4 is a fragmentary sectional view similar to that of FIG. 2 but showing a portion of a modified torque converter.
FIG. 5 is a sectional view as seen in the direction of arrows from the line V—V of FIG. 4.

The remaining components of the transmission shown in FIG. 1 will be described hereinafter. Referring now to FIGS. 2 and 3, there is shown a portion of the turbine wheel 15 and a portion of the stationary housing 17, both forming part of the torque converter 10. FIGS. 2 and 3 further show that portion or inlet 22a of the draining line 22 which is provided with the aforementioned permanently open draining aperture 23. The inlet portion 22a of the draining line 22 is integral with the stationary housing 17 of the torque converter 10; such portion 22a of the draining line 22 has a flange 22b which is bolted or otherwise sealingly secured to the major portion of the draining line 22, namely, to that portion which extends all the way to the corresponding port of the reversing valve 40.

The turbine wheel 15 has simply (i.e., not spatially) curved blades 15a all of which are parallel to the axis of rotation of the wheel 15 (i.e., parallel to the axis of the shaft 11 or 14). The arrow P denotes the normal (positive) direction of rotation of the turbine wheel 15 for traction operation and for braking in the unidirectional braking range. The arrow N denotes the negative direction of rotation of the turbine wheel 15, i.e., the direction of rotation in the counterbraking range. The arrow U denotes in FIG. 3 the peripheral speed of the outermost portion or tip of a turbine wheel blade 15a when the turbine wheel 15 is caused to rotate in the negative direction (arrow N). The arrow W denotes in FIG. 3 the relative blade flow. The direction of flow which is indicated by arrow W is determined by the direction of the curved center line at the tip of a blade 15a. By adding the vectors denoting the peripheral speed U and the relative blade flow W, one obtains a vector C which denotes the absolute flow at the outlet of the turbine. Since the angle between the vectors denoted by the arrows U and W is very small, the absolute flow of fluid (vector C) varies very little in response to variations of peripheral speed (arrow U) of the tips of blades 15a of the turbine wheel 15 (while the turbine wheel 15 rotates in the negative direction N). Also, the direction indicated by the arrow C deviates only slightly from the direction which is indicated by the arrow W (relative blade flow). Such circumstances are utilized to advantage as follows: The point of locus of communication of the draining line 22 with the torque converter 10 is placed closely behind the outlet of the turbine wheel (as considered in the direction of flow). Also, the inlet portion 22a of the draining line 22 is oriented in such a way that the direction of flow (arrow S) therein coincides, as closely as possible, with the direction (arrow C) of absolute flow in the corresponding portion of the working chamber of the torque converter 10 during braking in the counterbraking range. This ensures that, within the entire counterbraking range, one achieves an inflow of fluid into the draining line 22 without appreciable losses and, therefore, an increasing rate of fluid flow through the aperture 23 in response to increasing negative RPM of the turbine wheel 15. On the other hand, in the case of traction operation (i.e., when the turbine wheel 15 rotates in the direction of the arrow P), the inflow of fluid into the draining line 22 is unsatisfactory, i.e., evacuation of the working fluid from the torque converter 10 by way of the aperture 23 is much less pronounced.

The design of the torque converter 30 is analogous to that of the torque converter 10 FIG. 1 merely shows the inlet portion 42a of the draining line 42.

Whenever possible, the locus of communication of the inlet portion 22a of the draining line 22 with the stationary housing 17 of the torque converter 10 is selected in such a way that its center line (arrow S), as seen in the axial sectional view of FIG. 2, is located substantially in the central plane e of the turbine wheel blades 15a. In such construction, the direction of arrow S can coincide with or deviates only negligibly from the direction of absolute fluid flow (arrow C) at the outlet of the turbine (see FIG. 3). As already explained above, this is the direction of fluid flow in the counterbraking range.

Figure 6:
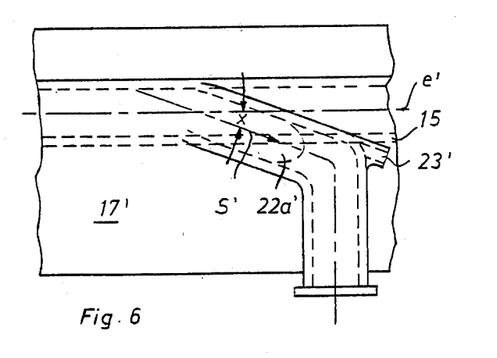
FIG. 6 is a view as seen in the direction of arrow VI in FIG. 5.

Referring to FIGS. 4 to 6, it will be seen that the locus of communication between the inlet portion 22a of the draining line and the stationary housing 17' can be placed in or close to the middle of such housing. Nevertheless, the direction (arrow S') of flow of working fluid in the inlet portion 22a' of the draining line is identical with or deviates only slightly from the direction which is indicated in FIG. 3 by the arrow C (direction of absolute flow). However, it must be borne in mind here that the portion 17a of the housing 17' causes a certain deflection of fluid flow between the outlet of the turbine and the inlet portion 22a' of the draining line. It would be impractical to orient the inlet portion 22a' of the draining line in such a way that the direction of inflow (arrow S') would be parallel to the central plane e' of a turbine blade; this would cause two successive deflections of the flow in opposite directions. Consequently, and as shown in FIG. 6, the arrangement (when the inlet portion 22a' of the draining line communicates with the central portion of the stationary housing 17') is such that the direction which is indicated by the arrow S' (i.e., the center line of the inlet portion 22a' of the draining line) and the plane e' make an acute angle x, e.g., an angle of between 5 and 30 degrees. The exact magnitude of the angle x depends on the extent of deflection of fluid flow by the portion 17a of the housing 17'. The plane e' is normal to the axis of the turbine wheel 15.

FIGS. 2 to 6 show that the aperture 23 or 23' of the draining line 22 or the draining line including the inlet portion 22a' is defined by a pronounced nipple which forms part of or constitutes the inlet portion 22a or 22a' of the draining line. Such nipple can be omitted, i.e., the aperture 23 or 23' can be provided directly in the wall of the draining line close to the locus where the draining line communicates with the stationary housing 17 or 17'.

The reasons for connecting the draining line with the stationary housing 17' in a manner as shown in FIGS. 4-6 (rather than in a manner as shown in FIGS. 2 and 3) may include the availability or lack of availability of space, convenience of manufacture and/or others.

In order to achieve the aforediscussed satisfactory progress of braking torque in the counterbraking range, it is normally necessary to resort to additional modifications of presently known and used hydrodynamic reversing transmissions. Thus, the ratio of the outer diameter $D_a$ to the inner diameter $D_i$ (see FIG. 2) of the turbine wheel 15 is preferably between 1.1 and 1.25. Furthermore, it is preferred to utilize a turbine wheel 15 with a large number of blades 15a, for example between 35 and 45 blades. In other words, the number of turbine blades should be so high that, at the outlet of the turbine wheel 15, the ratio of the distance t between the tips of neighboring blades 15a and the outer diameter $D_a$ of the turbine wheel 15 is between 0.06 and 0.09.

Figure 7:
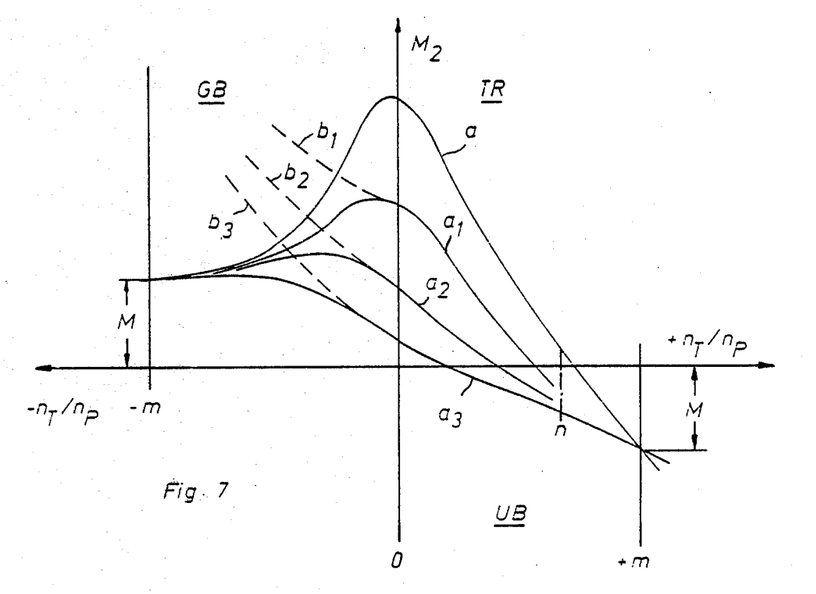
FIG. 7 is a diagram of various characteristic curves denoting the output torque at different positions of the guide vanes of a torque converter which embodies the invention and forms part of the improved hydrodynamic reversing transmission.

In the diagram of FIG. 7, torque $M_2$ which is applied to the output shaft 34 of the reversing transmission is measured along the ordinate and the ratio ($n_T/n_P$) between the RPM of the turbine wheel 15 or 35 and pump wheel 13 or 33 of the torque converter 10 or 30 is measured along the abscissa. If one assumes that the RPM ($n_P$) of the pump wheel 13 or 33 is constant, i.e., that the speed of the input shaft 8 is constant, the ratio $n_T/n_P$ is proportional to the RPM of the output shaft 34 and hence to the speed of forward or rearward movement of the vehicle which embodies the reversible transmission.

The diagram of FIG. 7 includes three sections, namely, the section TR denoting the traction operation (i.e., normal operation of the vehicle) of the torque converter 10 or 30, the section UB denoting the unidirectional braking range, and the section GB denoting the counterbraking range.

The curve a of FIG. 7 denotes the torque $M_2$ of the torque converter 10 or 30 with the guide vanes 18 or 38 in fully open positons. This curve resembles the characteristics torque curve of conventional torque converters which do not have adjustable guide vanes.

The curve a3 denotes the characteristic curve of the torque converter 10 or 30 when the guide vanes 18 or 38 are practically closed. In accordance with the invention, the curve a3 merges gradually into the curve a in response to progressing negative value of the ratio $n_T/n_P$ but the curve a3 does not intersect the curve a.

The broken-line curve b3 denotes the progress of a characteristic curve which would replace the curve a3 in the absence of features which are characteristic of the present invention.

The curves a1 and a2 denote the characteristic curves of the torque converter 10 or 30 in partly open positions of the guide vanes 18 or 38. The broken-line curved b1 and b2 denote the progress of curves corresponding to the curves a1 and a2 in conventional hydrodynamic reversing transmissions. It will be noted that the curves a1 and a2, too, merge gradually into the curve a but do not intersect the latter. The curves b1, b2 and b3 intersect the curve a.

The vertical phantom line n (close to the point where the curve a intersects the abscissa in the diagram of FIG. 7) denotes that, if desired, one can ensure automatic closing of the guide vanes 18 or 38 when the speed of the output shaft 34 reaches the value denoted by the line n. This exhibits the following advantages:

When the torque converter 10 or 30 is set for traction operation and the guide vanes 18 or 38 are fully open (note the curve a) while the forward speed of the vehicle rises toward and reaches the value denoted by the line n, the torque (see the curve a) which the torque converter 10 or 30 transmits is close to zero while the energy requirements of the torque converter are still relatively high. By closing the guide vanes 18 or 38 at the forward speed which is denoted by the line n, the torque changes along the line n from that denoted by the curve a to that denoted by the curve a3 so that the energy requirements of the torque converter 10 or 30 decrease and the torque converter performs a braking operation. Thus, one achieves, at the same time, that the forward speed which is denoted by the phantom line n is not exceeded at all or is not exceeded to an appreciable extent.

Nevertheless, a situation can arise when the vehicle reaches a speed which is indicated at +m or −m. These are the outermost boundaries of permissible maximum speeds. For example, such speeds can be reached when the valving element of the servo valve 60 is held in the neutral position "O" while the vehicle which embodies the improved transmission travels downhill. Furthermore, and as disclosed in the commonly owned U.S. Pat. No. 4,099,426 granted July 11, 1978 to Keller et al., the transmission may embody at least one so-called cruising torque converter (at least for one direction of travel of the vehicle), i.e., an additional torque converter for use in the course of traction operation within the upper range of speeds. The provision of a cruising torque converter can also lead to achievement of very high speed such as those indicated at +m and −m. FIG. 7 shows that, when the speed of the vehicle reaches the maximum permissible value +m or −m, the braking torque which is generated by the torque converter in the unidirectional braking range (section UB) is substantially identical or comes close to the braking torque which is generated in the counterbraking range (section GB in FIG. 7). This is indicated by the reference characters M. Moreover, the braking torque is then independent from the selected position of the guide vanes 18 or 38. Consequently, one and the same torque converter can be used as a safety brake for the vehicle regardless of whether the vehicle moves forwardly or in reverse.

Referring again to FIG. 1, this illustration further shows the means for automatically closing the guide vanes 18 or 38 when the speed of the vehicle embodying the improved reversing transmission reaches the aforediscussed value which is indicated in FIG. 7 by the phantom line n, as well as the regulating means which renders it possible to utilize the torque converter 10 or 30 as a safety brake.

The means for automatically closing the guide vanes 18 and 38 comprises a common adjusting device 80 which includes a cylinder 81, a piston 82 which is reciprocable in the cylinder 81, and a piston rod 83 which is connected with the piston 82 and is articulately connected with the adjusting rings 19 and 39. The exact details of the just mentioned parts of the device 80 form no part of the present invention; reference may be had to German Auslegeschrift No. 2,911,424. When the adjusting device 80 is idle, the piston 82 is biased to its lower end position (shown in FIG. 1) by a helical spring 84 which reacts against the upper end wall (as viewed in FIG. 1) of the cylinder 81. In such end position of the piston 82, the piston rod 83 causes the adjusting rings 19 and 39 to maintain the respective guide vanes 18 and 38 in closed positions.

The means for moving the piston 82 against the opposition of the spring 84 comprises an auxiliary pump 90 which can deliver pressurized fluid to a pressure line 90a via normally closed regulating valve 86. The latter is controlled by the operator of the vehicle through the medium of a pivotable pedal 85 or an analogous actuating element. The pressure line 90a further contains a solenoid-operated valve 87 which is normally open and can close in response to a signal transmitted via conductor means 78 which is connected to the output of a tachometer generator 79 monitoring the RPM of the output shaft 34. Thus, when the RPM of the output shaft 34 is less than that denoted by the phantom line n shown in the diagram of FIG. 7, the valve 87 is open and the operator of the vehicle can move the regulating valve 86 to partly or fully open position to thereby change the axial position of the piston rod 83 and to thus open the guide vanes 18 and 38 to a desired degree. The valve 87 seals the lower chamber of the cylinder 81 from the auxiliary pump 90 as soon as the monitoring means 79 transmits a signal which denotes that the RPM of the output shaft 34 has risen to the maximum permissible value (n); therefore, the operator is unable to maintain the guide vanes 18 or 38 in partly or fully open positions because the guide vanes are closed automatically since energization or deenergization of the solenoid 87a of the valve 87 entails a movement of the valving element of this valve to a position in which the lower chamber of the cylinder 81 communicates with the sump 7 via return line 87b. In other words, the spring 84 is free to expand and to return as well as to maintain the piston 82 in the illustrated lower end position.

The RPM of the output shaft 34 of the transmission is monitored by a second tachometer generator 70 or an analogous detector whose output is connected to the solenoid 71a of the valve 71 by way of conductor means 70a. The tachometer generator 70 is set in such a way that it transmits a signal to the solenoid 71a when the speed of the output shaft 34 rises to the maximum permissible speed +m or −m (see FIG. 7). The valve 71 is installed in the conduit 72 between the source 59 of pressurized fluid and the servo valve 60. A port 73 of the valve 71 is connected with the control lines 62, 62a by way of a dual check valve 74. The mobile component (e.g., a ball) of the check valve 74 normally assumes the illustrated position in which the line 73a is sealed from the lines 62 and 62a, i.e., the line 62 is free to communicate with the line 62a so that, when the operator desires, the valving element 46 can be shifted against the opposition of the biasing means 49. When the RPM of the output shaft 34 reaches or exceeds the permissible maximum value +m or −m, the signal which the tachometer generator 70 transmits via conductor means 70a causes the solenoid 71a to shift the valving element of the valve 71 so that the valving element seals the source 59 from the servo valve 60 and connects the source 59 with the line 73a so that the ball of the check valve 74 rises and seals the line 62a from the line 62. Pressurized fluid which is admitted via line 73a flows through the line 62a and causes the valving element 46 to move against the opposition of the biasing means 49, i.e., the torque converter 30 is rendered operative. This takes place independently of the momentary position of the valving element in the servo valve 60, i.e., regardless of whether such valving element is in the neutral position "O" or in one of the operative positions "V" and "R". The valve 71 can be called a bypass valve because it can be actuated by the tachometer generator 70 to bypass the servo valve 60 and to simultaneously cause the output shaft 34 to receive torque from the torque converter 30.

Each of the tachometer generators 79, 70 may comprise a switch which opens or closes when the RPM of the output shaft 34 rises to a preselected value.

An important advantage of the improved hydrodynamic reversing transmission is that the draining lines 22 and 42 are respectively provided with the aforementioned apertures 23 and 43 which allow for continuous flow of working fluid from the respective housings 17 and 37 and into the sump 7. Moreover, the apertures 23 and 43 are disposed in the regions where the working fluid flows from the corresponding housing 17 and 37. Otherwise stated, the fluid-admitting inlet portions 22a and 42a of the draining lines 22 and 42 are oriented in such a way that the direction (arrow S or S') of flow therein is practically identical with the direction of absolute flow (arrow C) in the counterbraking range. As already explained hereinbefore in connection with FIGS. 2 to 6, the direction of absolute flow (arrow C in FIG. 3) at the outlet of the housing 17 or 37 deviates, within the entire counterbraking range, at most very slightly from the direction of the center lines of blades 15a at the tips of the blades. Therefore, it is quite correct to state that the direction of flow in the aforementioned region of admission of fluid into the draining line 22 or 42 is at least substantially identical with or very close to the direction of center lines of the neighboring turbine wheel blades at the fluid discharging ends of such blades. Deviations from such relationship between the center lines of turbine wheel blades and the direction of fluid flow into the inlet portions of the draining lines will occur if the flow is deflected, for example, in a manner as discussed above in connection with FIGS. 4 to 6.

Another important advantage of the improved transmission is that the desirable fanwise pattern or distribution of characteristic curves (a, a1, a2 and a3 in FIG. 7) remains intact in the region of small negative ratios of the RPM of turbine wheel to the RPM of the pump wheel. Thus, by the simple expedient of adjusting the positions of guide vanes 18 and 38, it is possible to still select (in a very simple and convenient manner) very high braking moments within the aforementioned range of relatively small negative ratios $n_T/n_P$. At the same time, it is possible to select high or even extremely high output torque values in the neighboring region (traction operation) of positive ratios of the RPM of turbine wheel to the RPM of the pump wheel. The efficiency of the torque converters remains quite satisfactory.

As shown in FIG. 7, the characteristic curves which denote the braking moments at different positions of the guide vanes 18 and 38 approach each other when the negative ratio $n_T/n_P$ increases. It is even possible to cause at least some of the characteristic curves to merge into a single curve as soon as the aforementioned negative ratio reaches a given value. Such merger of characteristic curves takes place without intersecting, i.e., the characteristic curves progress or advance to the same level which is relatively low. This means that, when the aforementioned negative ratio increases beyond a certain value, the braking torque is relatively small and remains unchanged irrespective of the positions of the guide vanes 18 or 38. This, in turn, denotes that the braking action is independent of the positions of the guide vanes when the vehicle is driven at a relatively high speed.

A further important advantage of the improved transmission is that the reversing valve 40 can be actuated to switch from filling of the torque converter 10 to filling of the torque converter 30 or vice versa at any (even extremely high) speed of the vehicle which is driven by the improved transmission. In other words, the changeover can take place at a maximum forward or reverse speed and does not represent any danger to the transmission. Thus, a torque converter which rotates in the counterbraking range can be rapidly filled and such operation need not be preceded by closing of the corresponding guide vanes. This simplifies the task of the operator who need not be concerned with the positions of guide vanes 18 or 38 at the time he or she decides to fill the torque converter 10 while causing draining of the torque converter 30 or vice versa. Otherwise stated, the hydrodynamic torque converters of the improved transmission exhibit "natural" characteristic curves in the counterbraking range; such curves deviate pronouncedly or completely from the characteristic curves of conventional torque converters and are ideally or nearly ideally suited for a number of operations, for example, when the improved transmission is incorporated in an earth moving or like vehicle.

The apertures 23 and 43 allow for continuous draining of working fluid from the respective housings 17 and 37 when the torque converter 10 or 30 receives working fluid via filling line 21 or 41. The reversing valve 40 connects the draining lines 22, 42 with the sump 7 only during idling or when the torque converter 10 or 30 is to be drained on purpose, i.e., to reverse the direction of rotation of the output shaft 34.

The aforementioned advantages of the improved transmission and its torque converters can be explained as follows: When a torque converter operates in the counterbraking range, the direction of absolute fluid flow at the outlet of the housing 17 or 37 changes very little or not at all, and such direction deviates only slightly from the direction of relative fluid flow. This applies at least for the major part of the counterbraking range and, in many or most instances, for the entire counterbraking range. Thus, by the simple expedient of selecting the orientation of the inlet portion of the draining line 22 or 42 in such a way that the inlet portion constitutes an extension of the fluid flow passages between the neighboring blades of the turbine wheel 15 or 35, one ensures that the flow within the counterbraking range takes place practically without shocks and without any or without appreciable deflection during flow from the channels between the neighboring blades of the turbine wheel (namely, those blades which approach and are nearest to the inlet portion of the line 22 or 42) into the line 22 or 42. This means that such flow can readily enter the apertures 23 and 43 which are in permanent communication with the sump 7. The fact that the characteristic curves of braking moments which develop in the region of increasing negative turbine RPM while the corresponding guide vanes are wide open resemble downwardly sloping hyperbolae would indicate that the rate of evacuation of fluid via aperture 23 or 43 increases with increasing RPM of the turbine. It is important and advantageous to employ a positive displacement pump (such as the gear pump 50) because this ensures that the torque converter 10 or 30 invariably receives a constant stream of working fluid independently of the pressure which prevails in the working chamber of such torque converter. The relationship of specific volume of fluid which is supplied by the pump 50 to the cross-sectional areas of apertures in the draining lines is preferably within a predetermined range in order to further enhance the operation of the improved transmission. The just mentioned relationship depends, to a large extent, on the size and design of the torque converters; therefore, the optimum relationship is normally ascertained by experimentation subsequent to selection of the size and design of the torque converters.

German Auslegeschrift No. 1,140,789 discloses a torque converter wherein the orientation of the inlet portion of the draining line is such that it does not appreciably impede the outflow of working fluid from the housing. However, the just mentioned publication deals exclusively with the normal operating range of the torque converter, i.e., with the range within which the ratio of turbine wheel RPM to pump wheel RPM is a positive ratio (this corresponds to traction operation and the following braking in the unidirectional braking range). The torque converter of the German Auslegeschrift No. 1,140,789 is not intended to operate in the counterbraking range. Therefore, the structure which is described and shown in the just discussed German Auslegeschrift is not suggestive of the possibility of positively influencing the characteristic curves of the torque converters in the counterbraking range by the simple expedient of special orientation of inlet portions of the draining lines and other aforediscussed features of the improved torque converters and of the transmission embodying such converters.

In the embodiment which is illustrated in FIG. 1, the reversing valve 40 which can effect complete and rapid draining of the housing 17 or 37 is installed in the draining lines 22 and 42, i.e., in those lines which are provided with the apertures 23 and 43. This is not critical, i.e., it is also within the purview of the invention to provide the inlet portions 22a and 42a with apertures 23 and 43 in addition to discrete draining lines which perform the functions of major portions of the lines 22 and 42 shown in FIG. 1. However, the operation of the transmission and its torque converters is more satisfactory if the portions 22a and 42a constitute the only passages which allow for evacuation of working fluid from the respective housings 17 and 37, i.e., if the portions 22a and 42a form part of the respective draining lines. It has been found that the progress of characteristic curves shown in FIG. 7 is more satisfactory if the lines 22 and 42 constitute the sole means for permitting evacuation of working fluid from the corresponding housings 17 and 37. Thus, when a torque converter is in operation, working fluid should escape from its housing solely by way of the aperture 23 or 43. It is preferred to ensure that no working fluid will escape in other regions of the housing 17 or 37, e.g., in the regions where the primary or secondary shaft extends from the respective torque converter housing. Therefore, the torque converters are preferably provided with effective sealing devices, preferably with sealing devices of the type wherein the seal portion rotating with the shaft contacts the complementary stationary portion of the seal. If such contact-type shaft seals are replaced by labyrinth seals, the meandering paths which are defined by the labyrinth seals should be as narrow as possible.

German Pat. No. 2,706,950 discloses a hydrodynamic reversing transmission wherein the characteristic curves denoting the braking moments at various settings of the guide vanes in the counterbraking range form a fan-like pattern (note FIG. 4 of the German patent). However, the characteristic curves are substantially horizontal and parallel to each other, even when the forward speed of the vehicle embodying the patented transmission rises to the maximum value. This is desirable when the transmission drives a locomotive or another rail-mounted vehicle. However, the torque converters of the patented transmission employ fixed guide vanes and, whenever a torque converter is in operation, the working fluid flows along a closed path which extends through a liquid cooling station, i.e., the sump is not included in the path along which the working fluid is caused to flow whenever a torque converter receives working fluid. In other words, the reversing valve of the transmission which is disclosed in German Pat. No. 2,706,950 connects the draining line of the selected torque converter with a conduit for cooling of the circulating fluid and such conduit is further connected to the inlet of the respective torque converter. Consequently, the major part of working fluid in the cooling circuit is circulated by the torque converter itself. The filling pump merely circulates a relatively small percentage of the total volume of working fluid, i.e., such pump delivers only a relatively small quantity of working fluid into the aforementioned cooling circuit. The improved transmission need not resort to such cooling circuit or circuits, i.e., it is preferred to employ a positive displacement pump which can circulate large quantities of working fluid. This is desirable and advantageous because the transmission can rapidly react to signals which are transmitted by the operator to change the direction of rotation of the output shaft 34 or to change the magnitude of torque which the torque converter 10 or 30 transmits to the output shaft.

U.S. Pat. No. 4,099,426 to Keller et al. discloses a hydrodynamic transmission for vehicles wherein the torque converters comprise adjustable guide vanes and which further comprises an automatic safety brake. The brake cooperates with a signal generator which initiates actuation of the brake when the speed of the output shaft rises to a preselected value. The brake which is disclosed in the U.S. patent to Keller et al. is a hydrodynamic brake which is effective only when the output shaft of the transmission rotates in the forward direction. Replacement of such hydrodynamic brake with a twin brake whose operation is independent of the direction of rotation of the output shaft would contribute significantly to the initial and maintenance cost of the patented transmission. If the starting torque converters of the transmission which is disclosed in the U.S. patent to Keller et al. were to be used as braking means in addition to the aforementioned hydrodynamic brake of this patent, the patented transmission would necessitate an additional control system of the type disclosed in an earlier U.S. Pat. (No. 3,566,715) to Keller et al. The additional control system serves to ascertain the direction of movement of the vehicle and to actuate the corresponding starting torque converter.

On the other hand, the improved reversing transmission renders it possible to achieve a highly satisfactory and highly reliable braking action in a much simpler and less expensive way. This is due to the provision of the tachometer generator 70 or analogous RPM monitoring means which automatically initiates the establishment of a braking action as soon as the speed of the output shaft 34 rises to a preselected value, i.e., one (namely, always the torque converter 30) of the torque converters 10 and 30 then acts as a brake independently of the direction of movement of the vehicle which embodies the transmission. This is due to the fact that the braking torque which is furnished by one of the torque converters within the range of high negative RPM ratios can be readily selected in such a way (i.e., such torque can be so high) that it matches or approximates the braking torque which is produced in the unidirectional braking range at the maximum speed of the vehicle. Therefore, the one torque converter (30) can act as a safety brake for both directions of movement of the vehicle with attendant savings in space and material which are attributable to such simplification of the braking means. If the vehicle which embodies the improved transmission is driven primarily (or more frequently) in the forward direction, it is advisable and advantageous to select the torque converter which drives the output shaft in the reverse direction as a safety brake which is actuatable to reduce the speed of the output shaft 34 irrespective of the direction of rotation of such shaft, i.e., irrespective of whether the vehicle is driven forwardly or in reverse. The torque converter which drives the output shaft in reverse is used more frequently in the counterbraking than in the unidirectional braking range. The counterbraking range is more satisfactory because the energy requirements of the torque converter are lower.

The desirable features of the torque converters which are utilized in the improved reversing transmission can be used with advantage in other types of transmissions, e.g., in hydrodynamic-mechanical transmissions which employ a single torque converter. A hydrodynamic-mechanical transmission with a single torque converter is disclosed in the commonly owned U.S. Pat. No. 4,077,502 to Nitsche et al. The patented transmission comprises a reversing gearing downstream of the torque converter and a control system which reverses the operation of the gearing in response to reception of a braking signal. The improved torque converter 10 or 30 can be used with advantage in such transmission and can exhibit all or the majority of the aforediscussed features such as (a) that the aperture 23 or 43 is the only permanently open passage for evacuation of working fluid from the torque converter, (b) that the central plane (e') of a turbine blade and the direction of fluid flow (arrow S') in the inlet portion (see 22a' in FIG. 6) make an angle x of between 5 and 30 degrees, (c) that the reversing valve 40 is installed directly in the draining line (22 or 42), (d) that the tachometer generator 70 or analogous RPM monitoring means initiates a desirable braking action as soon as the RPM of the output shaft (i.e., the speed of the vehicle) rises to a predetermined value, and (e) that the tachometer generator 79 or analogous monitoring means initiates the closing of guide vanes when the ratio $n_T/n_P$ (while the guide vanes are held in open positions) reaches or exceeds a predetermined value (n) at which the driving torque $M_2$ equals or at least approximates zero.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hydrodynamic reversing transmission, particularly for use in earth moving and like vehicles, comprising rotary input means; reversible rotary output means; forward and reverse drive trains connecting said input means with said output means and respectively including first and second hydrodynamic starting torque converters respectively comprising first and second working circuits which are respectively rendered operative and ineffective, also within the counterbraking range, in response to admission and evacuation of working fluid, each of said circuits including a stationary housing, a turbine wheel designed for substantially centrifugal flow of fluid therethrough and means for influencing the torus stream in the respective circuit; a source of pressurized working fluid; a sump; first and second filling lines connecting said source with the respective circuits; first and second draining lines having inlet portions connected with the respective housings and outlet portions discharging into said sump; and reversing means for regulating the flow of fluid in said lines so that said first filling line delivers fluid from said source to said first circuit and said first draining line is sealed when said second filling line is sealed from said source and said second draining line is open, and vice versa, said inlet portions having permanently open apertures for evacuation of some fluid from the respective housings, said apertures being arranged to admit working fluid into said sump and said inlet portions being disposed in the regions of outflow of fluid from the respective turbine wheels, the orientation of said inlet portions being such that the direction of fluid flow therein coincides, at least substantially, with the direction of fluid flow toward said inlet portions within said counterbraking range.

2. The transmission of claim 1, wherein said means for influencing the torus stream comprises adjustable guide vanes.

3. The transmission of claim 1, wherein, said source includes a constant-delivery pump arranged to draw fluid from said sump.

4. The transmission of claim 1, wherein the turbine wheel of each of said circuits has an outer diameter Da and an inner diameter Di, the ratio of Da to Di being between 1.1 and 1.25.

5. The transmission of claim 1, wherein each of said turbine wheels comprises a plurality of blades having tips spaced apart by equal distances t, said turbine wheels having outer diameters Da and the ratio of t to Da being between 0.06 and 0.09.

6. The transmission of claims 1, wherein said apertures constitute the only outlets for unobstructed and uninterrupted outflow of working fluid from the respective torque converters during each and every stage of operation of such converters.

7. The transmission of claim 1, wherein the directions of fluid flow into said inlet portions make acute angles with the planes which are normal to the axes of the respective turbine wheels.

8. The transmission of claim 7, wherein each of said acute angles is between 5 and 30 degrees.

9. The transmission of claim 1, wherein said reversing means includes a valve installed in said draining lines.

10. The transmission of claim 1, wherein one of said torque converters is arranged to brake said output means irrespective of the direction of movement of the vehicle in which the transmission is used in response to an increase of the RPM of said output means to a predetermined value, and further comprising means for monitoring the RPM of said output means and means for actuating said reversing means to connect said source with the filling line for said one torque converter and to seal the respective draining line when the monitored RPM of said output means reaches said value.

11. The transmission of claim 10, wherein said one torque converter is said second torque converter in said reverse drive train.

12. The transmission of claim 1, wherein said means for influencing include guide vanes movable between open and closed positions and each of said working circuits further comprises a pump wheel rotatable with respect to the corresponding turbine wheel, and further comprising means for opening and closing the guide vanes of said working circuits, means for monitoring the ratio $n_T/n_P$ of RPM of the turbine wheel to RPM of the pump wheel of the operative torque converter, and means for effecting closing of the guide vanes of the operative torque converter when said ratio reaches a predetermined value and while the output torque at least approximates zero.

* * * * *